United States Patent
Favaretto

(10) Patent No.: US 11,993,129 B2
(45) Date of Patent: May 28, 2024

(54) ELECTRIC TRACTION VEHICLE WITH AN AIR CONDITIONING SYSTEM THAT CAN ALSO BE ACTIVATED WHEN THE VEHICLE IS PARKED AND CORRESPONDING CONTROL METHOD

(71) Applicant: FERRARI S.p.A., Modena (IT)

(72) Inventor: Fabrizio Favaretto, Formigine (IT)

(73) Assignee: FERRARI S.p.A., Modena (IT)

(*) Notice: Subject to any disclaimer, the term of this patent is extended or adjusted under 35 U.S.C. 154(b) by 0 days.

(21) Appl. No.: 17/614,587

(22) PCT Filed: May 20, 2021

(86) PCT No.: PCT/IB2021/054381
§ 371 (c)(1),
(2) Date: Nov. 29, 2021

(87) PCT Pub. No.: WO2021/234628
PCT Pub. Date: Nov. 25, 2021

(65) Prior Publication Data
US 2023/0079953 A1    Mar. 16, 2023

(30) Foreign Application Priority Data
May 20, 2020    (IT) .................. 102020000011677

(51) Int. Cl.
*B60H 1/00* (2006.01)
*B60H 1/22* (2006.01)
(Continued)

(52) U.S. Cl.
CPC ..... *B60H 1/00392* (2013.01); *B60H 1/00778* (2013.01); *B60H 1/2218* (2013.01);
(Continued)

(58) Field of Classification Search
CPC ............ B60H 1/00028; B60H 1/00271; B60H 1/00392; B60H 1/00778; B60H 1/02; B60H 1/2218; B60H 2001/003
See application file for complete search history.

(56) References Cited

U.S. PATENT DOCUMENTS 3,451,469 A * 6/1969 Leslie ................... B60H 1/16
165/41

FOREIGN PATENT DOCUMENTS

DE         494879 C      3/1930
DE    102010043335 A1    5/2012
(Continued)

OTHER PUBLICATIONS

International Search Report and Written Opinion for Application No. PCT/IB2021/054381 dated Jul. 30, 2021, 15 pages.

*Primary Examiner* — Jonathan Bradford
(74) *Attorney, Agent, or Firm* — CANTOR COLBURN LLP

(57) ABSTRACT

Electric vehicle having a chassis, which supports a pair of front wheels and a pair of rear wheels, a passenger compartment, which is arranged between the front wheels and the rear wheels, at least one electric motor connected to drive wheels, an electric energy storage device, an air conditioning system, which is designed to air condition the passenger compartment by heating or cooling the air present in the passenger compartment, and a control unit, which is configured to activate the air conditioning system even when the vehicle is parked and connected to an external charging system, wherein the air conditioning system has at least one thermal device, which is designed to exchange heat directly and only with the chassis and the control unit is configured to activate the thermal device even when the vehicle is parked and connected to an external charging system.

11 Claims, 3 Drawing Sheets

(51) Int. Cl.
*B60L 1/02* (2006.01)
*B60R 13/08* (2006.01)
(52) U.S. Cl.
CPC ............ *B60L 1/02* (2013.01); *B60R 13/0876* (2013.01); *B60H 2001/003* (2013.01)

(56) References Cited

FOREIGN PATENT DOCUMENTS

DE 102018004839 A1 12/2019
JP 1142924 A 2/1999

* cited by examiner

ELECTRIC TRACTION VEHICLE WITH AN AIR CONDITIONING SYSTEM THAT CAN ALSO BE ACTIVATED WHEN THE VEHICLE IS PARKED AND CORRESPONDING CONTROL METHOD

CROSS-REFERENCE TO RELATED APPLICATIONS

This patent application claims priority from Italian patent application no. 102020000011677 filed on 20 May 2020, the entire disclosure of which is incorporated herein by reference.

TECHNICAL FIELD

The invention relates to an electric drive vehicle with an air conditioning system that can also be activated when the vehicle is parked and to a relative control method.

The invention finds advantageous application in an electric drive car, to which explicit reference will be made in the description below without because of this loosing in generality.

PRIOR ART

The main problem affecting current electric drive cars is the range, since automotive batteries are capable of storing a relatively limited quantity of energy and have very long charging times (compared to petrol or Diesel refuelling times of cars provided with an internal combustion engine). Furthermore, the relatively small range of an electric drive car can further be reduced if, during the travel, the air conditioning system is used to heat or cool the passenger compartment because the temperature on the outside of the car is particularly hostile (namely, it is very cold or very hot). Besides, during the coldest months of the year, in a heat vehicle (namely a vehicle provided with an internal combustion engine), the heat produced by the combustion, which constitutes a loss of energy for the purposes of powering the vehicle, can be used "for free" in order to heat the passenger compartment, whereas the same does not apply to an electric drive vehicle, for the efficiency of the powertrain is so high that it is not possible (convenient) to use the waste heat generated by the electric motors, by the electronic power converters and by the electric energy storage devices.

In order to reduce the use of the air conditioning system during the travel (and, especially, along the first kilometres of the path), thus reducing the electric energy used by the air conditioning system, manufacturers suggested using the air conditioning system (shortly) before the beginning of the travel, when the electric drive car is still connected to a charging system; in this way, the passenger compartment can reach the desired temperature not by using the electric energy stored in the battery of the electric drive car, but by using the electric energy provided by the network. The quantity of electric energy saved is significant (when the external temperature is particularly hostile), since, during the travel, the air conditioning system is used for the sole purpose of maintaining the desired temperature already present and does not need to be used to allow the passenger compartment to go from the environmental temperature to the desired temperature (with temperature differences than can amount to dozens of degrees Celsius in the middle of the winter or of the summer).

Basically, when the electric drive car is parked and connected to a charging system, the driver sets the travel beginning time and, hence, the air conditioning system is automatically activated (using the electric energy provided by the charging system) with a suitable advance so as to allow the passenger compartment to reach the desired temperature at the exact travel beginning time.

However, when the external temperature is particularly hostile (namely, it is very cold or very hot), as soon as the travel starts, the passenger compartment tends to exchange a relatively large quantity of heat with the outside and, therefore, the air conditioning system almost immediately has significant energy consumptions.

Patent application DE102010043335A1 and patent application DE102018004839A1 disclose an electric drive vehicle, in which the passenger compartment air conditioning system is activated when the vehicle is parked and connected to an external energy source, so that the passenger compartment already has the desired temperature when the driver gets on board the vehicle to start a travel.

Patent DE494879C describes an induction heating device for the chassis of a motor vehicle.

Patent application JPH1142924 discloses a car in which the door sills (namely, the part of the chassis located under the doors) are internally hollow and are used as pneumatic channels to feed (hot or cold) conditioned air generated by an air conditioning system located in a front position towards the rear doors, so that said conditioned air can be diffused through the rear doors in the area of the rear seats.

DESCRIPTION OF THE INVENTION

The object of the invention is to provide an electric drive vehicle with an air conditioning system that can also be activated when the vehicle is parked and a relative control method, said electric drive vehicle not being affected by the drawbacks described above and, at the same time, being easy and economic to be manufactured.

According to the invention, there are provided an electric drive vehicle with an air conditioning system that can also be activated when the vehicle is parked and a relative control method according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
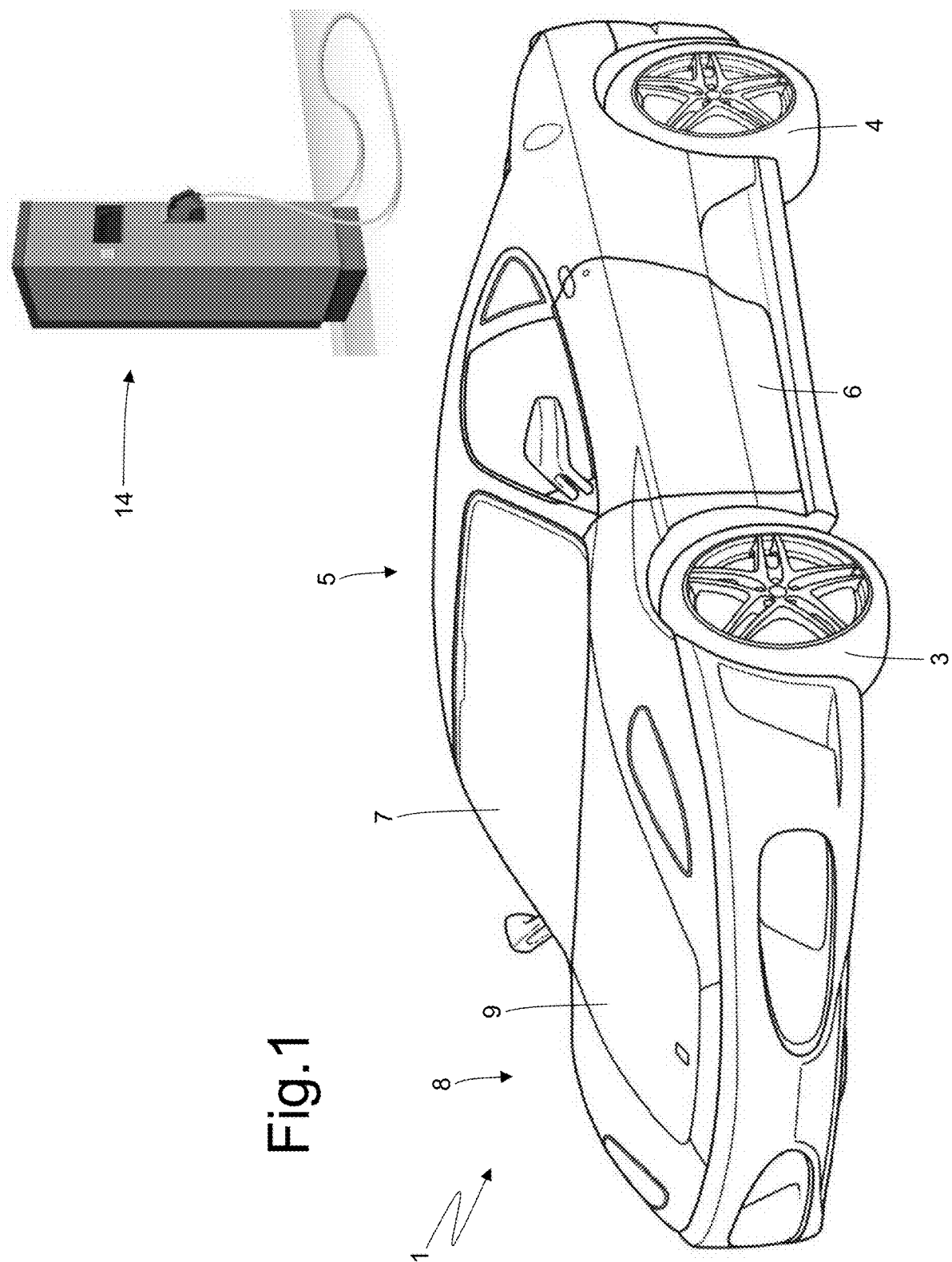
FIG. 1 is a perspective view of a car according to the invention.

In FIG. 1, number 1 indicates, as a whole, a car with a rear (or central) motor comprising a chassis 2 (schematically shown in FIGS. 2 and 3), which supports a pair of front wheels 3 and a pair of rear wheels 4).

Between the front wheels 3 and the rear wheels 4 there is a passenger compartment 5, to which access is granted through a pair of doors 6; at the front the passenger compartment 5 is delimited by a windshield 7. In front of the passenger compartment 5 there is a front compartment 8 (for example, though not exclusively, for baggage), which is closed at the top by a front hinged hood 9. Behind the passenger compartment 5 there is a rear motor compartment, which is closed at the top by a rear hinged hood.

Figure 3:
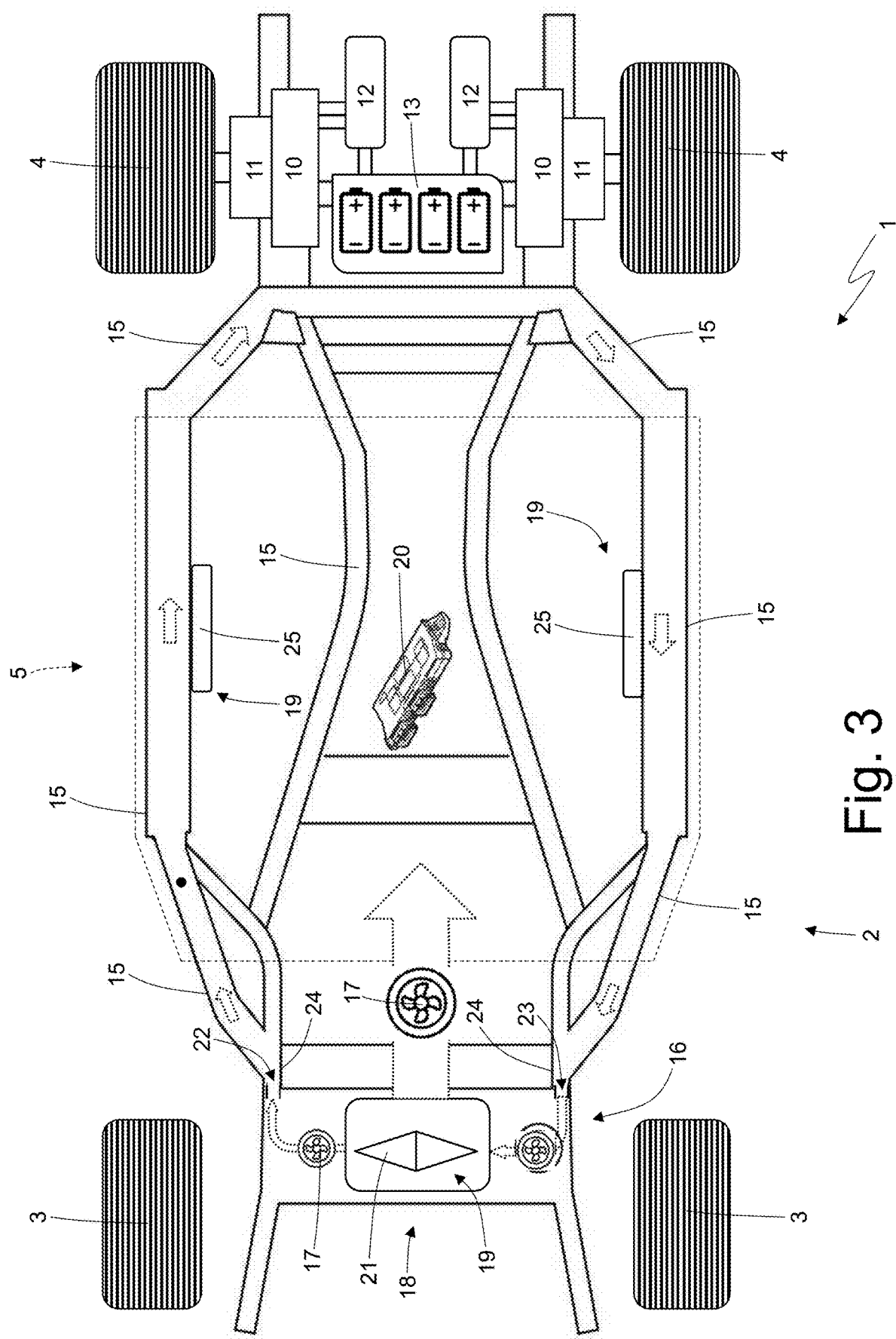
FIG. 3 is a schematic plan view of the car of FIG. 1.

According to FIG. 3, the car 1 has an electric drive (powertrain) and comprises two electric motors 10, each connected to a corresponding rear drive wheel 4 by means of a mechanical drivetrain 11 (for example comprising an epicyclic gearing). Each electric motor 10 is controlled by a corresponding electronic power converter 12, which provides the corresponding stator winding with an AC voltage and exchanges electric energy with a storage device 13. According to FIG. 1, when the car 1 is parked, it can be connected—through a cable—to an external charging system 14, which supplies the storage device 13 with electric energy.

Figure 2:
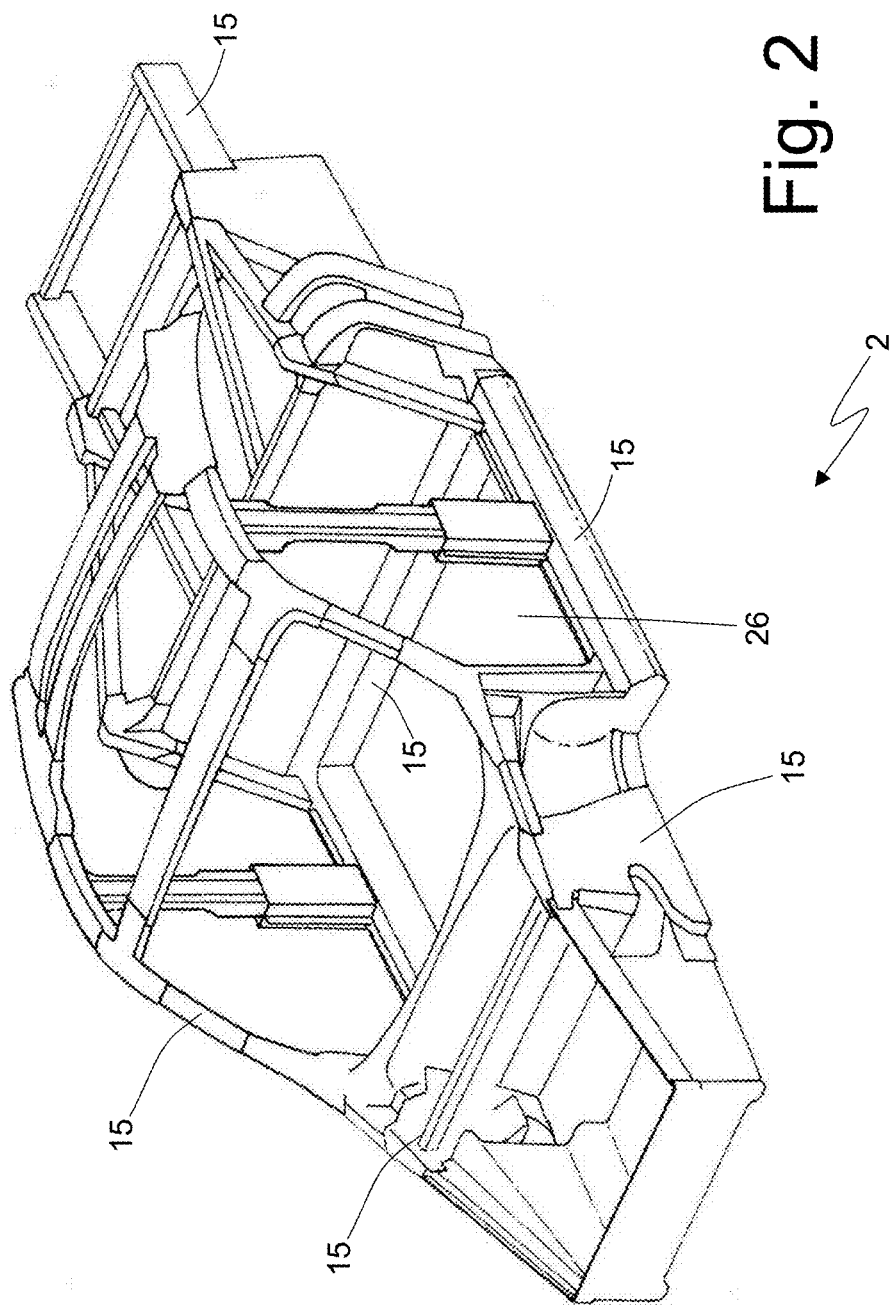
FIG. 2 is a schematic perspective view of a chassis of the car of FIG. 1.

According to FIGS. 2 and 3, the chassis 2 comprises a set of internally hollow boxed elements 15; said boxed elements 15 consist, for example, of internally hollow linear bars, which are made of a light metal alloy (generally speaking, an aluminium-based alloy), are manufactured through extrusion and are joined to one another by means of welding in the area of structural nodes preferably defined by joining bodies.

According to FIG. 3, the car 1 comprises an air conditioning system 16, which is designed to air condition the passenger compartment 5 by heating or cooling the air present in the passenger compartment 5. In particular, the air conditioning system 16 comprises one or more fans 17, which are operated by respective electric motors and are designed to generated a forced air circulation, and an air treatment unit 18, which is designed to cool or heat the air that is caused to circulate by the fans 17; typically, the air treatment unit 18 comprises a heat pump, which is operated by an electric motor. Furthermore, the air conditioning system 16 comprises a thermal device 19, which is designed to directly exchange heat with the sole chassis 2; namely, the thermal device 19 is not capable of exchanging heat with the passenger compartment 5, since it is completely dedicated to operating with the sole chassis 2.

Finally, the car 1 comprises a control unit 20, which is configured to activate the air conditioning system 16 also when the vehicle 1 is parked and connected to the external charging system 14 (so as not to use the electric energy stored in the storage device 13); in particular, when the vehicle 1 is parked and connected to the external charging system 14, the control unit 20 activates the air conditioning system 16 both to air condition the passenger compartment 5 and (using the thermal device 19) to heat the chassis 2 (when the air conditioning requires the heating of the passenger compartment 5) or to cool the chassis 2 (when the air conditioning requires the cooling of the passenger compartment 5).

According to FIG. 3, the thermal device 19 comprises a feeding member 21, which is configured to feed at least part of the air treated by the treatment unit 18 into the chassis 2; namely, thanks to the feeding member 21, at least part of the air treated by the air treatment unit 18 is fed into the chassis 2 instead of reaching the passenger compartment 5. In particular, the chassis 2 comprises at least one inlet opening 22, through which the air treated by the air treatment unit 18 enters the chassis 2, and at least one outlet opening 23, through which the air exits the chassis 2.

The treatment unit 18 is configured to completely recirculate the air flowing out of the chassis 2 from the outlet opening 23; namely, in order to heat or cool the chassis 2, the same air used without using (as much as possible) air coming from the outside. In particular, the inlet opening 22 and the outlet opening 23 are close to one another on the same side of the chassis 2 so that the air coming from the outlet opening 23 can be conditioned again and then reintroduced into the inlet opening 22 covering a relatively short path (namely, making the air recirculation simpler and more efficient).

It should be pointed out that a first path for the circulation of the air treated by the air conditioning system 16 and intended for the air conditioning of the passenger compartment 5 is different and completely isolated from a second path for the circulation of the air treated by the air conditioning system 16 and intended for the heating or cooling of the chassis 2, so that the air circulating in the passenger compartment 2 never mixes with the air circulating through the chassis 2. Namely, the air treated by the air conditioning system 16 and intended for the air conditioning of the passenger compartment 5 is different and always separate from the air treated by the air conditioning system 16 and intended for the heating or cooling of the chassis 2. As a consequence, the two air paths only share the source of heat or cold (consisting of one single common heat or cold generator of the air conditioning system 16), but do not share the same air, so that the air circulating in the passenger compartment 5 is isolated from the air circulating through the chassis 2.

According to a preferred embodiment, the chassis 2 internally comprises at least one dividing wall 24, which separates the inlet opening 22 from the outlet opening 23 so as to create, inside the chassis 2, a longer obligatory path, which is as varied as possible, between the inlet opening 22 and the outlet opening 23 (in this way, the air fed into the chassis 2, by flowing through the inlet opening 22, reaches as much of the frame 2 as possible before getting to the outlet opening 23).

According to a possible, simpler embodiment, the air treatment unit 18 is configured to introduce air at the same temperature into the passenger compartment 5 and into the chassis 2; as a consequence, the air treatment unit 18 carries out the same heat exchange both for the air introduced into the passenger compartment 5 and for the air introduced into the chassis 2. According to an alternative, more complex embodiment, the air treatment unit 18 is configured to introduce into the passenger compartment 5 colder air, when the air conditioning involves heating, or hotter air, when the air conditioning involves cooling, compared to the air introduced into the chassis 2; as a consequence, the air treatment unit 18 carries out different thermal treatments for the air introduced into the passenger compartment 5 and the air introduced into the chassis 2. This embodiment is more complex in that it requires a differentiated air treatment in the air treatment unit 18, though it offers the advantage of cooling or heating the chassis 2 to greater extent than the one to which the passenger compartment 5 is cooled or heated, so as to store in the chassis 2 a greater quantity of heat or cold; to this regard, it should be pointed out that the passenger compartment 5 should have a temperature of circa 18-20 degrees Celsius in the winter and circa 26-28 degrees Celsius in the summer, whereas the chassis 2 can easily reach temperatures ranging from −10° C. (even in the summer) to +60° C. (even in the winter).

According to a different embodiment, the thermal device 19 could comprise (as an alternative or in addition to the air treatment unit 18) at least one electric heater 25, which is mounted on the chassis 2 so as to heat the chassis 2 through conduction; typically, the electric heater 25 comprises a resistance, which generates heat through Joule effect when an electric current flows through it.

According to a preferred embodiment, a thermal insulation 26 (schematically shown in FIG. 2) is provided, which is arranged between the chassis 2 and the outside (especially, though not exclusively, between the chassis 2 and the road surface) and is not interposed between the chassis 2 and the passenger compartment 5. The function of the thermal insulation 26 is that of reducing the exchange of heat between the chassis 2 and the outside, though encouraging the exchange of heat between the chassis 2 and the passenger compartment 5.

In the embodiment shown in the accompanying figures, the invention is applied to a car 1, but it can obviously be applied to a different type of vehicle having a closed passenger compartment (for example a van, a truck, a bus . . . ).

The embodiments described herein can be combined with one another, without for this reason going beyond the scope of protection of the invention.

The car 1 described above has numerous advantages.

First of all, when the car 1 is used after having been conditioned during the previous parking phase and using the electric energy provided by the charging system 14, the passenger compartment 5 preserves the desired temperature much longer, even without the activation of the air conditioning system 16, thanks to the fact that the passenger compartment 5 is not surrounded by the chassis 2 having the external temperature, but is surrounded by the chassis 2 having (at first) the same temperature as the passenger compartment 5 or even a lower temperature than the passenger compartment 5 (when the air conditioning involves cooling) or a higher temperature than the passenger compartment 5 (when the air conditioning involves heating).

This result is obtained thanks to the fact of storing thermal energy (hot in the winter, cold in the summer) using a significant part of the mass of the car 1 (namely, the chassis 2 and also the parts exchanging heat with the chassis 2 through conduction) as a thermal storage element. Since electric vehicles have a significant mass, by bringing a large part of the mass of the vehicle to a high temperature in the winter and to a low temperature in the summer, this thermal energy can then be used by the passenger compartment 5 in order to preserve, during the first travel phase, ideal temperatures without having to use a significant action of the air conditioning system 16, which, in order to operate, necessarily has to use the electric energy stored in the storage device 13 (hence, reducing the range of the vehicle).

LIST OF THE REFERENCE NUMBERS OF THE FIGURES 1 car
2 chassis
3 front wheels
4 rear wheels
5 passenger compartment
6 doors
7 windshield
8 front compartment
9 front hood
10 electric motors
11 mechanical drivetrain
12 electronic power converter
13 storage device
14 charging system
15 boxed elements
16 air conditioning system
17 fans
18 air treatment unit
19 thermal device
20 control unit
21 feeding member
22 inlet opening
23 outlet opening
24 dividing wall
25 electric heater
26 thermal insulation

The invention claimed is:

1. An electric vehicle (1) comprising:
a chassis (2) which supports a pair of front wheels (3) and a pair of rear wheels (4) and comprises a plurality of internally empty boxed elements (15);
a passenger compartment (5) which is arranged between the front wheels (3) and the rear wheels (4);
at least one electric motor (10) connected to drive the pair of rear wheels (4);
an electric energy storage device (13);
an air conditioning system (16), which is designed to air condition the passenger compartment (5) by heating or cooling the air present in the passenger compartment (5) and comprises an air treatment unit (18) designed to cool or heat the air; and
a control unit (20) which is configured to activate the air conditioning system (16) when the vehicle (1) is parked and connected to an external charging system (14);
wherein the air conditioning system (16) comprises at least one thermal device (19) that feeds at least part of the air treated by the air treatment unit (18) inside the chassis (2) for exchanging heat directly and only with the chassis;
wherein the chassis (2) comprises: at least one inlet opening (22) through which the air treated by the air treatment unit (18) enters the chassis (2), and at least one outlet opening (23) through which the air exits the chassis (2); and
wherein the control unit (20) is configured to activate the thermal device (19) which feeds at least part of the air treated by the air treatment unit (18) inside the chassis (2) only when the vehicle (1) is parked and connected to an external charging system (14).

2. The electric vehicle (1) according to claim 1, wherein the air treatment unit (18) is configured to recirculate the air exiting the chassis (2).

3. The electric vehicle (1) according to claim 1, wherein the inlet opening (22) and the outlet opening (23) are arranged on the same side of the chassis (2) so that the air coming from the outlet opening (23) can be conditioned again and then re-introduced into the inlet opening (22).

4. The electric vehicle (1) according to claim 1, wherein a first path through which circulates the air treated by the air conditioning system (16) and intended for the air conditioning of the passenger compartment (5) is different and completely isolated from a second path through which circulates the air treated by the air conditioning system (16) and intended to heat or cool the chassis (2) so that the air circulating in the passenger compartment (5) does not mix with the air circulating through the chassis (2).

5. The electric vehicle (1) according to claim 3, wherein the chassis (2) internally comprises at least one dividing wall (24) which separates the inlet opening (22) from the outlet opening (23) so as to create inside the chassis (2) ran obligatory path between the inlet opening (22) and the outlet opening (23).

6. The electric vehicle (1) according to claim 2, wherein the air treatment unit (18) is configured to introduce air at the same temperature into the passenger compartment (5) and into the chassis (2).

7. The electric vehicle (1) according to claim 2, wherein the air treatment unit (18) is configured to introduce colder air into the passenger compartment (5) when the air conditioning provides heating, or warmer air when the air conditioning provides cooling compared to the air that is introduced into the chassis (2).

8. The electric vehicle (1) according to claim 1, wherein the thermal device (19) comprises at least one electric heater (25), which is mounted on the chassis (2) to heat the chassis by thermal conduction (2).

9. The electric vehicle (1) according to claim 1 further comprising a thermal insulation (26) which is arranged between the chassis (2) and the external environment and is not arranged between the chassis (2) and the passenger compartment (5).

10. The electric vehicle (1) according to claim 9, wherein the thermal insulation (26) is arranged at least between the chassis (2) and the road surface.

11. A control method of the electric vehicle (1) according to claim 1 further comprising the step of activating, only when the vehicle (1) is parked and connected to an external charging system (14), the air conditioning system (16) both to air condition the passenger compartment (5) by heating or cooling the air present in the passenger compartment (5), and to heat or cool the chassis (2).

* * * * *